July 31, 1951 B. J. CROSS 2,562,484
PURIFICATION OF STEAM
Filed Oct. 18, 1947 2 Sheets-Sheet 1
Fig. 2.
Fig. 1.
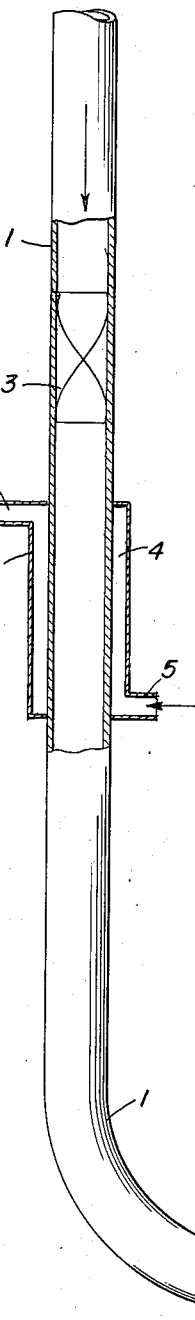
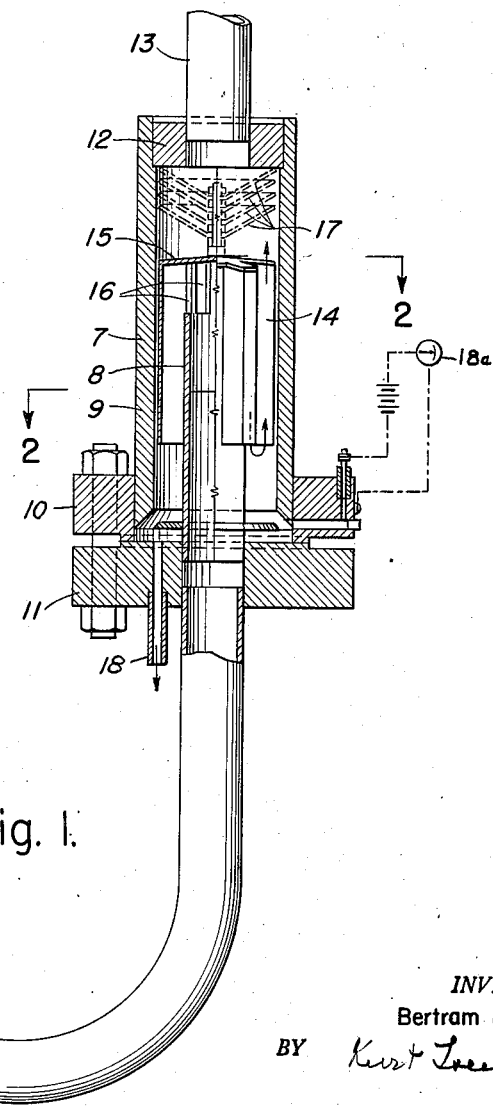
INVENTOR.
Bertram J. Cross
BY July 31, 1951  B. J. CROSS  2,562,484
PURIFICATION OF STEAM
Filed Oct. 18, 1947  2 Sheets-Sheet 2
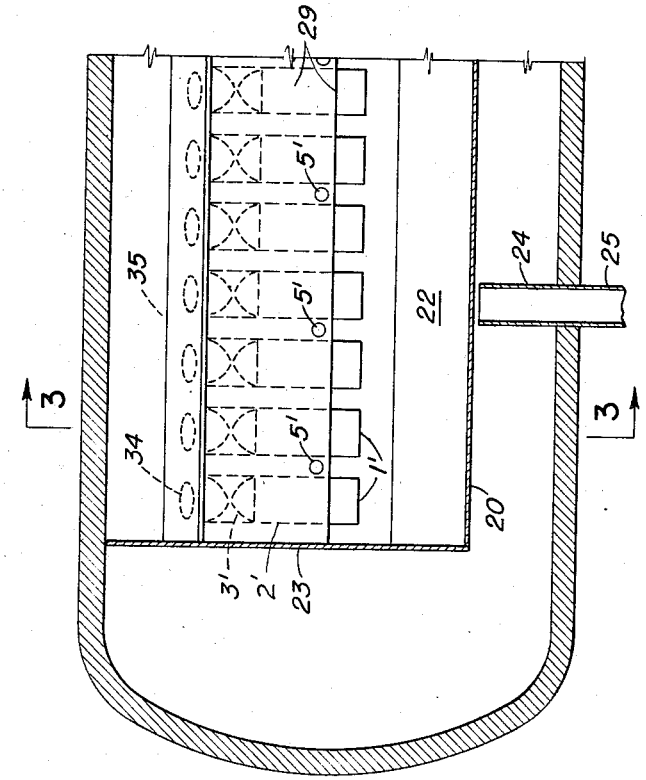
INVENTOR.
Bertram J. Cross
BY Patented July 31, 1951

2,562,484

UNITED STATES PATENT OFFICE 2,562,484

PURIFICATION OF STEAM

Bertram J. Cross, Nyack, N. Y., assignor, by mesne assignments, to Combustion Engineering-Superheater, Inc., a corporation of Delaware Application October 18, 1947, Serial No. 780,626

6 Claims. (Cl. 183—32)

This invention relates to purifiers and has for its principal object a novel method and means for removing impurities, whether in solid, in liquid or in vapor state, from vapors produced from a liquid by evaporation.

A particular application of the invention is the purification of steam produced from a boiler water of relatively higher impurity. For example, in present day steam boilers it is possible by mechanical means of separating the impurities from the steam, to obtain steam containing as little as one part per million of entrained or dissolved solids. It is however extremely difficult to reduce the impurity below this value by such means. By means of the novel technique and apparatus herein described it will be possible to take steam containing about one part per million of impurities and further purify it to a fraction of this value.

The invention, together with attendant objects and advantages, will best be understood from the following detailed description of an illustrative embodiment thereof when read in conjunction with the accompanying drawings wherein:

Fig. 1 is a diagrammatic representation of apparatus embodying one form of the invention;

Fig. 2 is a cross section taken on line 2—2 of Fig. 1;

Fig. 3 is a cross section through a steam and water drum of a steam boiler showing a form of the invention applied within the drum, taken on line 3—3 of Fig. 4; and Fig. 4 is a cross section taken on line 4—4 of Fig. 3.

Referring to Fig. 1, steam from a vaporizer (steam boiler or other—not shown) passes through conduit 1 into a condenser 2. In advance of the condenser with respect to the steam flow, means are provided to whirl the steam, such as a helical member 3. The condenser 2 is here shown having water jacket 4 surrounding conduit 1 and provided with inlet and outlet water connections 5 and 6. Since very little surface is required to condense the requisite vapor for the purposes of this invention the elementary form of condenser illustrated will usually suffice; but any other form of condenser may of course be used.

Conduit 1 continues, in the direction of steam flow, and enters a steam and water separator 7. Any form of separator that will effect the desired separation of steam and water may here be used. A preferred form comprises an inner tube 8 connected to conduit 1 and surrounded by an outer tube 9. This outer tube 9 is provided at its lower end with lower flange 10 which connects to a companion flange 11 fastened to the end of conduit 1, and at its upper end with an upper plug 12 which fastens into the outer tube 9 and to the outlet conduit 13 from the separator.

Surrounding the separator's inner tube 8 are a multiplicity of U-shaped conduits 14 (see Fig. 2), the open ends of the U-members being fastened to the outer surface of the inner tube 8 and extending downwardly along the inner tube 8 to a spaced distance from lower flange 11 (see Fig. 1). The upper end of inner tube 8 and the upper end of the associated U-shaped conduits 14 terminate at a spaced distance from upper plug 12. A cap plate 15 covers the upper end of inner tube 8, extends over the upper ends of U-shaped conduits 14 and forms a seal with these so as to prevent steam from escaping upwardly through these ends as well as from tube 8. The upper end of the inner tube 8 is provided with ports 16 connecting into the U-shaped conduits 14. Above cap plate 15 and mounted thereon are a multiplicity of screens 17; these may satisfactorily have the conical shape indicated. A drain connection 18 is provided from the interior of separator 7 for withdrawing the condensate; if desired same may be supplemented by conventional apparatus 18a for indicating excessive (abnormal) water level in the interior.

The steam and water mixture enters the separator through conduit 1 flowing upwardly through inner tube 8, out of ports 16 into the U-shaped conduits 14 and downwardly therethrough, and leaves the U-shaped conduits at the bottom to turn and flow upwardly between the U-shaped conduits (see Fig. 2) and thence through screens 17 to the outlet conduit 13. The U-shaped conduits are of smaller cross sectional area than the spaces between the U-shaped conduits, so that the steam has a relatively higher velocity traveling downwardly through the U-shaped conduits than it has passing upwardly between them. This reversal in the flow of steam causes the water to separate out downwardly into the bottom of the separator. Any moisture thereafter remaining in the steam will be removed by the pack of screens 17 at the top of the separator.

In Figs. 3 and 4 each condenser 2 is similar to that shown in Fig. 1 and is mounted directly within the steam and water separating drum 19 of a boiler. A partition 20 separates the drum 19 into two compartments 21 and 22.

Preferably partition 20 is spaced from the drum 19 at its bottom end so as to provide a water passage. End plates 23, one at each end of the drum, form end walls for the compartment 22 between partition 20 and the shell of drum 19. A standpipe 24 is provided within the drum 19 to maintain a water level above said water passage below partition 20, the illustrated standpipe 24 being connected to the downcomer 25 from the drum 19.

A multiplicity of similar condensers 2' as shown in Fig. 4 are placed adjacent partition 20 in spaced relation to one another. Each condenser comprises a central conduit 1' provided with a helical member 3' for whirling the incoming steam, and a water jacket 4' surrounding the central conduit for receiving cooling water. The jacket 4' is provided with inlet and outlet connections 5' and 6'. In this instance the inlet 5' is connected to the feed water supply line 26 by pipe 27, the boiler feed water being used as cooling water.

As shown the water jacket 4' may be formed as a single box which surrounds all of the inner conduits 1' of the condensers 2'; the partition 20 forms one side of said jacket 4' and is spaced from the top plate 28 to form the overflow outlet 6' for the cooling water; and a plate 29 extending continuously adjacent all of the condensers 2' forms the other side of said jacket 4'. This plate 29 is provided with connections 5' to pipes 27 connecting into the feed water supply line 26. The top and bottom of said jacket 4', designated 28 and 30 respectively, are provided with holes to accommodate the inner tubes 1' of the condensers and are sealed to said inner tubes.

A partition 31 extends from the plate 29 to the wall of the drum 19 to form a seal therewith. Below said partition 31 is provided a separator 32 for separating steam and water leaving the drum 19 through offtake 33. Said separator 32 may comprise a bundle of screens through which the steam and water leaving the condensers flow.

Steam and water mixture to be purified is delivered to the drum 19 via tubes 34. A baffle 35 deflects the steam-water mixture discharged from tubes 34 downwardly into the drum.

In operation, referring to Fig. 1, steam flows from a boiler (not shown) through conduit 1 into and through the helical member 3 which gives it a whirl whereby any water, such as a mist, entrained by the steam is thrown by centrifugal force to the walls of conduit 1 beyond member 3.

The condenser 2, being located just beyond member 3 with respect to steam flow, is proportioned to condense a fraction of the steam passing through it, for example, one percent thereof. Impurities present in the steam are contained in the entrained water or mist and are carried to the walls of conduit 1 with the water, and the water is then diluted by the amount of the steam condensed in passing through condenser 2.

Thus, helical member 3 performs the function of separating entrained water from the steam and concentrating said water onto the inner surface of tube 1, precisely at the location where subsequent condensation of steam will occur within the cooled section of pipe 1. Intimate mixing of the impure entrained water with the clean condensate is thereby assured. Initial separation of entrained impure water from the steam for the purpose of thorough admixture with subsequently condensed water is essential for efficient operation of applicant's device. For it can be appreciated that if the impure moisture carried by the steam would be allowed, without separation from the steam, to pass through the center space of that section of tube 1 surrounded by the condenser cooling medium, admixture of the clean water resulting from steam condensed on the inner surface of tube 1 with the impure moisture entrained in the steam passing through the center of tube 1 would not be as intimate as if that moisture had been concentrated (as by action of the helical member 3) on the inner surface of tube 1 where condensation is taking place. Since this condensed steam is entirely free from impurities, the concentration of impurities in the steam-entrained water which is thrown out of the steam onto the walls of the conduit 1 is reduced in proportion to the amount of steam condensed.

If, for example, the entrained water in the steam entering the condenser 2 amounts to 0.1% of the weight of the steam and if the impurities in the water are 1000 P. P. M. (parts per million) of dissolved solids, the impurities in the steam will be 1000 P. P. M. multiplied by 0.001 or 1 P. P. M. If one percent of the steam is condensed in condenser 2, the dilution of the entrained water by the condensate is about tenfold and the deconcentration of impurities in said water will likewise be about tenfold, and will then be about 100 P. P. M. Now if in passing through the separator 7 all but 0.1% of said diluted water is separated out of the steam (and discharged from the steam line via drain 18), this 0.1% of the water carried out of the separator with the steam will contain but a concentration of 100 P. P. M. multiplied by 0.001 or 0.1 P. P. M. of impurities. In this manner the impurities in the steam entering the condenser 2 and amounting to 1 P. P. M. are reduced to 0.1 P. P. M. in the purified steam leaving the separator 7 via upper outlet 13, a tenfold reduction.

A further advantage of this method of steam purification is the removal of vaporized solids. It is known that some of the impurity of steam exists in vapor form and consists of the vapor phase of dissolved constituents of the boiler water salts. Such vapors exist in proportion to their concentration in the boiler water with which the steam is in contact. The vapor phase of such substances present in the steam are also reduced in concentration by this above described method of steam purification.

Silica for example, will, at high temperatures exert an appreciable vapor pressure and it will occur in steam as a vapor in proportion to its concentration in the boiler water and in the mist carryover of boiler waters in steam. At any given condition of temperature and pressure the ratio of the concentration of silica vapor in steam and the concentration of silica in the water in contact with the steam will be a constant value.

If, as in the process described, the silica concentration of the moisture in the steam is reduced, a corresponding reduction will be effected in the concentration of silica vapor in the steam, the excess silica vapor in the steam being absorbed by or dissolved in the moisture present, until the above mentioned equilibrium ratio is again restored.

The deconcentration of silica in the steam has been described above by way of an example. Other salts exhibit the same phenomena and may be deconcentrated in a similar manner.

The above described novel method of reducing the impurities in steam is independent of the concentration of the feed water to the vaporizer. It differs from the so-called steam washers heretofore used in that the steam is not washed with the feed water in direct contact. The condenser 2 is of the out-of-contact type and consequently there is no contamination of the steam by the cooling water.

The operation of the apparatus shown in Figs. 3-4 is similar to that shown in Figs. 1-2. The steam from the steam and water drum of a boiler discharges into drum 19 through tubes 34 and is deflected downward by baffle 35. A preliminary separation of steam and water occurs in the reversal of the steam from downward to upward flow. The steam after passing to the top of the drum 19 through up pass 36, enters the condensers 2' at the top via openings 34. In passing downward through each condenser 2' the steam is whirled by the helical element 3' thereby causing entrained water to be thrown onto the wall of conduit 1' within the condenser.

In passing through the condenser a fraction of the steam is condensed on the wall of conduit 1' to dilute the entrained water and thereby cause a lower concentration of impurities therein. The diluted, deconcentrated water and steam thereafter passes through the steam separator 32 where the major portion of the entrained water is separated out of the steam and therewith a proportionate part of the impurities.

As disclosed in Figs. 3-4, the cooling water may be the feed water which enters the condenser 1' via branch pipes 27 from feed pipe 26. The condenser water leaves the condenser through overflow passage 6' and thence discharge into the steam space 21 of drum 19. The standpipe 24 functions to maintain a water level in the drum 19 which forms a seal for the bottom of baffle 20.

Although Figs. 3-4 show the invention applied to a so-called dry drum which receives its steam from the steam and water drum of a boiler, the invention may likewise be applied to the steam and water drum directly. In this case, the tubes 34 are riser tubes discharging the steam and water mixture from the steam generating tubes directly into drum 19. The water level may be raised above that shown in Fig. 3 so as to cover any downcomer tubes leaving the drum.

While certain preferred embodiments of my invention have been shown and described, it will be understood that such disclosures are illustrative rather than restrictive and that changes in construction, combination and arrangement of parts may be made without departing from the spirit and scope of the invention as claimed.

What I claim is:

1. In apparatus for reducing the impurity content of steam which initially carries entrained moisture, the combination of a tube through which the steam to be treated is passed, first separator means in said tube effective to throw a major portion of said entrained moisture against the tube's interior wall surface, condenser means surrounding said tube and effective to flow over the tube exterior a cooling medium which causes a portion of the moisture-freed steam to condense on the tube's interior wall surface without contamination by the cooling medium, conduit means for admixing the uncontaminated condensate with said earlier-separated moisture and for causing the resultant liquid admixture of reduced impurity concentration to be picked up by and carried along with the steam that leaves the condenser length of tube, and second separator means acting upon said leaving steam in a manner to remove a major portion of all of said carried admixture therefrom whereby to reduce the impurity content of that leaving steam to an exceedingly low value.

2. In apparatus for reducing the impurity content of steam which carries entrained moisture, the combination of a substantially vertical tube, means for passing the steam to be treated downwardly through said tube, vane means in said tube for imparting to the down-flowing steam a whirling motion which separates therefrom a major portion of said entrained moisture and throws same against the tube's interior wall surface, condenser means surrounding said tube below said vane means in the direction of steam flow and there effective to contact the tube exterior with a low-temperature medium which cools the interior wall surface of condenser-surrounded tube length and thereby causes a portion of the moisture-freed steam pasing therethrough to condense thereon without contamination by the cooling medium, conduit means for admixing the uncontaminated condensate with said earlier-separated moisture and for causing the resultant reduced-impurity-concentration admixture to be picked up by and carried along with the steam that leaves the aforesaid condenser length of tube, and further separator means thereafter acting upon said leaving steam and effective to remove therefrom a major portion of all of said carried admixture whereby to reduce to an exceedingly low value the impurity content of that leaving steam.

3. In apparatus for reducing the impurity content of steam which initially carries entrained moisture, the combination of first and second legs of conduit disposed substantially vertically and interconnected at their lower ends, means for flowing the steam to be purified downwardly through said first conduit leg for subsequent upward passage through said second leg, first separator means in said first leg effective to whirl said incoming steam and thereby throw a major portion of the entrained moisture therein against the interior wall surface of first-leg conduit, condenser means surrounding said first-leg conduit below said first separator and there effective to flow over the conduit exterior a cooling medium which causes a portion of the down-flowing moisture-freed steam to condense on the interior wall surface of condenser-surrounded leg length without contamination by the cooling medium, means including the lower first-leg conduit portion and said second-leg conduit interconnection for admixing the uncontaminated first-leg condensate with said earlier-separated moisture and for causing the resultant liquid admixture of reduced impurity concentration to be picked up by and carried along with the steam that leaves the aforesaid condenser length of first-leg conduit and thereafter flows upwardly through the second-leg conduit, and second separator means disposer in said second-leg conduit and there acting upon said upwardly flowing steam in a manner to remove a major portion of all of said carried admixture therefrom and thereby reduce the impurity content of that steam to an exceedingly low value.

4. In the art of reducing impurities in steam which initially contains entrained moisture, the method steps which comprise first separating a major portion of the entrained moisture from the steam, then condensing a portion of the moisture-freed steam without contaminating same by the cooling medium, next admixing the uncontaminated condensate with said earlier-separated moisture thereby reducing the impurity concentration of the resultant liquid admixture, and finally more completely separating and removing a major portion of said dispersed admixture from said steam thereby reducing the impurity content of the latter to an exceedingly low value.

5. In apparatus for reducing the impurity content of steam which carries entrained moisture, the combination of a conduit through which the steam is passed, first separating means in said conduit effective to separate a major portion of said entrained moisture onto the interior wall of said conduit, condenser means associated with said conduit to cause a portion of the steam to condense within said conduit without contamination by the condenser cooling medium and to form a mixture with said entrained moisture of less impurity concentration, and second separating means associated with said conduit and acting to separate and remove a major portion of said mixture from the steam whereby to reduce the impurity content of the steam leaving said second separator to an exceedingly low value.

6. In the art of reducing impurities in steam which initially contains entrained moisture, the method steps which comprise first separating a major portion of the entrained moisture by centrifugal action and flowing said separated moisture over a condenser surface, then condensing a portion of the moisture-freed steam on the said condenser surface without contaminating same by the cooling medium, next admixing the uncontaminated condensate with said earlier-separated moisture thereby reducing the impurity concentration of the resultant liquid admixture, and finally completely separating and removing a major portion of said admixture of uncontaminated condensate and earlier-separated moisture from said steam, thereby reducing the impurity content of the latter to an exceedingly low value.

BERTRAM J. CROSS.

REFERENCES CITED

The following references are of record in the file of this patent:

UNITED STATES PATENTS

| Number | Name | Date |
| --- | --- | --- |
| 462,275 | McGahan | Nov. 3, 1891 |
| 833,376 | Edson | Oct. 16, 1906 |
| 1,679,090 | Lammert | July 31, 1928 |
| 1,823,470 | Rohlin | Sept. 15, 1931 |
| 1,916,337 | Schmidt | July 4, 1933 |
| 2,074,505 | Goldstein | Mar. 23, 1937 |